US009596273B2

(12) United States Patent
Roche et al.

(10) Patent No.: US 9,596,273 B2
(45) Date of Patent: *Mar. 14, 2017

(54) SYSTEMS AND METHODS FOR SHARING OF MEDIA SESSIONS WITHIN A SOCIAL NETWORK

(71) Applicant: Facebook, Inc., Menlo Park, CA (US)

(72) Inventors: Alexandre Roche, San Francisco, CA (US); Lincoln Hochberg, Palo Alto, CA (US); Vishu Gupta, Atherton, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/627,362

(22) Filed: Feb. 20, 2015

(65) Prior Publication Data

US 2015/0172325 A1 Jun. 18, 2015

Related U.S. Application Data

(63) Continuation of application No. 13/542,549, filed on Jul. 5, 2012, now Pat. No. 9,002,940.

(51) Int. Cl.
| | |
|---|---|
| *G06F 15/16* | (2006.01) |
| *H04L 29/06* | (2006.01) |
| *H04L 12/58* | (2006.01) |
| *H04L 29/08* | (2006.01) |
| *G06Q 50/00* | (2012.01) |
| *G06F 17/30* | (2006.01) |

(52) U.S. Cl.
CPC ......... *H04L 65/1069* (2013.01); *H04L 51/00* (2013.01); *H04L 51/04* (2013.01); *H04L 51/32* (2013.01); *H04L 51/36* (2013.01); *H04L 65/00* (2013.01); *H04L 67/10* (2013.01); *G06F 17/30873* (2013.01); *G06Q 50/01* (2013.01)

(58) Field of Classification Search
CPC ......... H04L 51/00; H04L 51/04; H04L 51/36; H04L 51/32; H04L 65/00; H04L 67/10
See application file for complete search history.

(56) References Cited

U.S. PATENT DOCUMENTS

| | | | | |
|---|---|---|---|---|
| 7,817,649 | B2 * | 10/2010 | Kim | H04L 65/4061 370/410 |
| 9,002,940 | B2 * | 4/2015 | Roche | H04L 51/36 709/204 |
| 2006/0117264 | A1 * | 6/2006 | Beaton | G06Q 10/107 715/751 |
| 2007/0226315 | A1 * | 9/2007 | Espelien | H04N 7/17318 709/217 |
| 2013/0073983 | A1 * | 3/2013 | Rasmussen | G06Q 30/02 715/753 |

* cited by examiner

*Primary Examiner* — Yves Dalencourt
(74) *Attorney, Agent, or Firm* — Baker Botts L.L.P.

(57) ABSTRACT

In one embodiment, a computing device identifies a set of second users to participate in an ongoing media session which was initiated by a first user. Each of the identified second users has a social-networking relationship with the first user, or a social-networking relationship with a media item of the ongoing media session. The computing device provisions the ongoing media session to second users, so that the second users join the ongoing media session in progress at the current point in time of the ongoing media session. The computing device sends a notification to the first user indicating that the second users have joined the ongoing media session.

54 Claims, 12 Drawing Sheets

SYSTEMS AND METHODS FOR SHARING OF MEDIA SESSIONS WITHIN A SOCIAL NETWORK

PRIORITY

This application is a continuation under 35 U.S.C. §120 of U.S. patent application Ser. No. 13/542,549, filed 5 Jul. 2012.

FIELD OF THE INVENTION

The present invention relates to the field of social networking More particularly, the present invention provides a technique for users of a social network to share media sessions with each other.

BACKGROUND

Internet social networks have become a significant phenomenon. Social networks allow an Internet user to create an account and a user profile and interact with other users of the social network. A social network user can share content and interact with content shared by other users. A social network may also offer chat functionality by which users may interact with each other in real-time. Social network users typically assemble a group of friends or followers with whom they interact. Once approved, the "friendship" typically gives both users access to each other's profiles and the content posted on them. Content postings and other user activities may generate stories that are visible to other users. A user may view stories generated by the activities of his friends by accessing their profiles individually or by accessing his news feed, an interface that displays stories from several users and summarizes the activities of the user's friends. Friends can comment on, share, or otherwise interact with each other's stories. In this way, social networks allow users to mimic real-life interactions in the context of an online community.

A social network may provide users with increasingly sophisticated functionality. Early social networks offered little more than a simple interface for users to communicate and post messages. Now users may share different types of content and interact with each other's content in a variety of ways. In addition, as technology has evolved and social network usage has grown, tools for third-party services have been introduced to make their functionality and content available within the social network.

Initially, social network users could only access static content such as text and images, and could do so only using features that were directly provided by the social network. A social network now may allow users to share and interact with dynamic content such as music, videos, and games. In addition to providing such content and functionality themselves, a social network may collaborate with third party entities to bring other popular services to social network users. Many social networks provide application programming interfaces (APIs) that allow third party entities to deliver their content and functionality through social networking portals. Among these third party entities are digital media providers.

SUMMARY

To facilitate the sharing of media sessions by users within a social network, a social networking system provides, for a second user of a social networking system, a reference about a first media session for a first user of the social networking system. The social networking system receives a request to participate in the first media session from the second user and facilitates provision of a second media session for the second user that is synchronized with the first media session.

According to an embodiment, the first media session includes at least one of an audio stream, a video stream, and a gaming session. The first media session may include media from at least one of an audio application, a video application, and a gaming application. The social networking system may further facilitate provision of the first media session for the first user. The social networking system may further identify the second user to the first user in response to the facilitating. The media of the first media session may be selected by the first user. The social networking system may further present the first media session and the second media session as one session to the first user and the second user. The first user and the second user may be friends within the social networking system.

According to an embodiment, the social networking system may further provide for a third user of the social networking system the reference about the first media session, receive a request to participate in the first media session from the third user, and facilitate provision of a third media session for the third user that is synchronized with the first media session. The social networking system may cause the reference to be displayed as a snippet or as a story. The social networking system may associate the reference with a resource of the social networking system, wherein the resource includes at least one of a news feed, a ticker, and a chat interface. The receiving may include receiving a user interaction with a component of the reference.

According to an embodiment, the social networking system determines whether the second user satisfies a criterion before the providing. The criterion may pertain to at least one privacy setting of the first user. The facilitating may include collaborating with a media service to provide the first media session for the first user, wherein the criterion pertains to availability of the media service to the second user. The social networking system may further cause termination of the second media session when a media item in the first media session ends. The social network may further cause transitions of the second media session to be synchronized with transitions of the first media session.

Many other features and embodiments of the invention will be apparent from the accompanying drawings and from the following detailed description.

Figure 1:
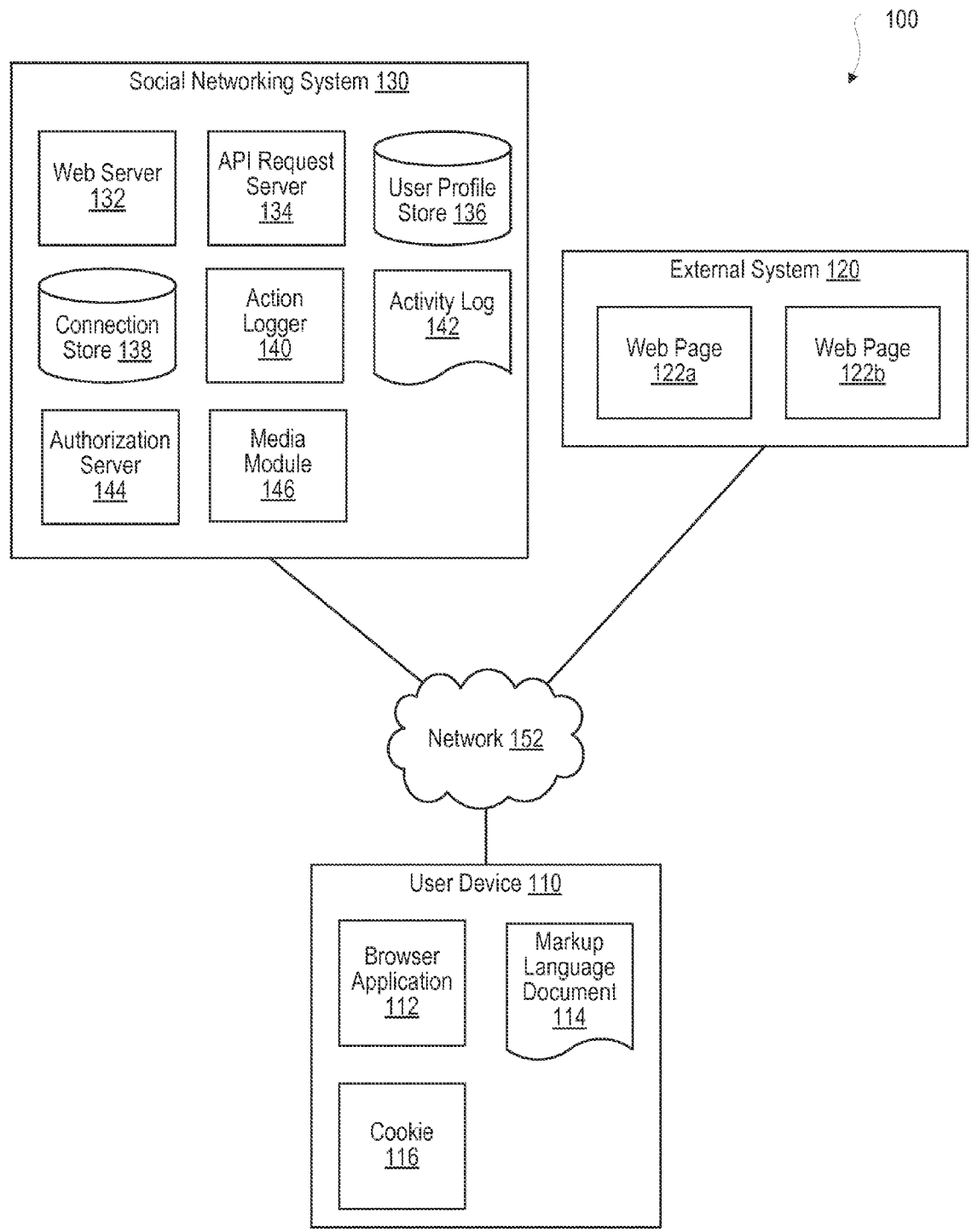
FIG. 1 depicts a system for facilitating real-time sharing of media sessions within a social networking system in accordance with an embodiment of the invention.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Social Networking System-General Introduction

FIG. 1 is a network diagram of a system 100 for sharing of media sessions within a social network in accordance with an embodiment of the invention. The system 100 includes one or more user devices 110, one or more external systems 120, the social networking system 130, and a network 150. For purposes of illustration, the embodiment of the system 100, shown by FIG. 1, includes a single external system 120 and a single user device 110. However, in other embodiments, the system 100 may include more user devices 110 and/or more external systems 120. In certain embodiments, the social networking system 130 is operated by a social network provider, whereas the external systems 120 are separate from the social networking system 130 in that they may be operated by different entities. In various embodiments, however, the social networking system 130 and the external systems 120 operate in conjunction to provide social networking services to users (or members) of the social networking system 130. In this sense, the social networking system 130 provides a platform or backbone, which other systems, such as external systems 120, may use to provide social networking services and functionalities to users across the Internet.

The user device 110 comprises one or more computing devices that can receive input from a user and transmit and receive data via the network 150. In one embodiment, the user device 110 is a conventional computer system executing, for example, a Microsoft Windows compatible operating system (OS), Apple OS X, and/or a Linux distribution. In another embodiment, the user device 110 can be a device having computer functionality, such as a smart-phone, a tablet, a personal digital assistant (PDA), a mobile telephone, etc. The user device 110 is configured to communicate via the network 150. The user device 110 can execute an application, for example, a browser application that allows a user of the user device 110 to interact with the social networking system 130. In another embodiment, the user device 110 may interact with the social networking system 130 through an application programming interface (API) provided by the native operating system of the user device 110, such as iOS and ANDROID. The user device 110 is configured to communicate with the external system 120 and the social networking system 130 via the network 150, which may comprise any combination of local area and/or wide area networks, using wired and/or wireless communication systems.

In one embodiment, the network 150 uses standard communications technologies and protocols. Thus, the network 150 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 150 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 150 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 110 may display content from the external system 120 and/or from the social networking system 130 by processing a markup language document 114 received from the external system 120 and from the social networking system 130 using a browser application 112. The markup language document 114 identifies content and one or more instructions describing formatting or presentation of the content. By executing the instructions included in the markup language document 114, the browser application 112 displays the identified content using the format or presentation described by the markup language document 114. For example, the markup language document 114 includes instructions for generating and displaying a web page having multiple frames that include text and/or image data retrieved from the external system 120 and the social networking system 130. In various embodiments, the markup language document 114 comprises a data file including extensible markup language (XML) data, extensible hypertext markup language (XHTML) data, or other markup language data. Additionally, the markup language document 114 may include JavaScript Object Notation (JSON) data, JSON with padding (JSONP), and JavaScript data to facilitate data-interchange between the external system 120 and the user device 110. The browser application 112 on the user device 110 may use a Java Script compiler to decode the markup language document 114.

The markup language document 114 may also include, or link to, applications or application frameworks such as FLASH™ or Unity™ applications, the Silverlight™ application framework, etc.

In one embodiment, the user device 110 also includes one or more cookies 116 including data indicating whether a user of the user device 110 is logged into the social networking system 130, which may enable customization of the data communicated from the social networking system 130 to the user device 110. In one embodiment, the user device 110 also includes a news feed rendering module 118.

The external system 120 includes one or more web servers that include one or more web pages 122a, 122b, which are communicated to the user device 110 using the network 150. The external system 120 is separate from the social networking system 130. For example, the external system 120 is associated with a first domain, while the social networking system 130 is associated with a separate social networking domain. Web pages 122a, 122b, included in the external system 120, comprise markup language documents 114 identifying content and including instructions specifying formatting or presentation of the identified content.

The social networking system 130 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure.

Users may join the social networking system 130 and then add connections to any number of other users of the social networking system 130 to whom they desire to be connected. As used herein, the term "friend" refers to any other user of the social networking system 130 to whom a user has formed a connection, association, or relationship via the social networking system 130. For example, in an embodiment, if users in the social networking system 130 are represented as nodes in the social graph, the term "friend" can refer to an edge formed between and directly connecting two user nodes.

Connections may be added explicitly by a user or may be automatically created by the social networking system 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral ("two-way"), or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system 130 by Joe, but Joe does not wish to form a mutual connection, a unilateral connection may be established. The connection between users may be a direct connection; however, some embodiments of the social networking system 130 allow the connection to be indirect via one or more levels of connections or degrees of separation.

In addition to establishing and maintaining connections between users and allowing interactions between users, the social networking system 130 provides users with the ability to take actions on various types of items supported by the social networking system 130. These items may include groups or networks (i.e., social networks of people, entities, and concepts) to which users of the social networking system 130 may belong, events or calendar entries in which a user might be interested, computer-based applications that a user may use via the social networking system 130, transactions that allow users to buy or sell items via services provided by or through the social networking system 130, and interactions with advertisements that a user may perform on or off the social networking system 130. These are just a few examples of the items upon which a user may act on the social networking system 130, and many others are possible. A user may interact with anything that is capable of being represented in the social networking system 130 or in the external system 120, separate from the social networking system 130, or coupled to the social networking system 130 via the network 150.

The social networking system 130 is also capable of linking a variety of entities. For example, the social networking system 130 enables users to interact with each other as well as external systems 120 or other entities through an API, a web service, or other communication channels. The social networking system 130 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 130. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 130 modifies edges connecting the various nodes to reflect the relationships and interactions.

The social networking system 130 also includes user-generated content, which enhances a user's interactions with the social networking system 130. User-generated content may include anything a user can add, upload, send, or "post" to the social networking system 130. For example, a user communicates posts to the social networking system 130 from a user device 110. Posts may include data such as status updates or other textual data, location information, images such as photos, videos, links, music or other similar data and/or media. Content may also be added to the social networking system 130 by a third-party. Content "items" are represented as objects in the social networking system 130. In this way, users of the social networking system 130 are encouraged to communicate with each other by posting text and content items of various types of media through various communication channels. Such communication increases the interaction of users with each other and increases the frequency with which users interact with the social networking system 130.

The social networking system 130 includes a web server 132, an API request server 134, a user profile store 136, a connection store 138, an action logger 140, an activity log 142, an authorization server 144, and a media module 146. In an embodiment of the invention, the social networking system 130 may include additional, fewer, or different components for various applications. Other components, such as network interfaces, security mechanisms, load balancers, failover servers, management and network operations consoles, and the like are not shown so as to not obscure the details of the system.

The user account store 136 maintains information about user accounts, including biographic, demographic, and other types of descriptive information, such as work experience, educational history, hobbies or preferences, location, and the like that has been declared by users or inferred by the social networking system 130. This information is stored in the user account store 136 such that each user is uniquely identified. The social networking system 130 also stores data describing one or more connections between different users in the connection store 138. The connection information may indicate users who have similar or common work experience, group memberships, hobbies, or educational history. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 130, such as non-person entities, buckets, cluster centers, images, interests, pages, external systems, concepts, and the like are also stored in the connection store 138.

The social networking system 130 maintains data about objects with which a user may interact. To maintain this data, the user account store 136 and the connection store 138 store instances of the corresponding type of objects maintained by the social networking system 130. Each object type has information fields that are suitable for storing information appropriate to the type of object. For example, the user account store 136 contains data structures with fields suitable for describing a user's account and information related to a user's account. When a new object of a particular type is created, the social networking system 130 initializes a new data structure of the corresponding type, assigns a unique object identifier to it, and begins to add data to the object as needed. This might occur, for example, when a user becomes a user of the social networking system 130, the social networking system 130 generates a new instance of a user profile in the user account store 136, assigns a unique identifier to the user account, and begins to populate the fields of the user account with information provided by the user.

The connection store 138 includes data structures suitable for describing a user's connections to other users, connections to external systems 120 or connections to other entities. The connection store 138 may also associate a connection type with a user's connections, which may be used in conjunction with the user's privacy setting to regulate access to information about the user. In an embodiment of the invention, the user account store 136 and the connection store 138 may be implemented as a federated database.

Data stored in the connection store 138, the user account store 136, and the activity log 142 enables the social networking system 130 to generate the social graph that uses nodes to identify various objects and edges connecting nodes to identify relationships between different objects. For example, if a first user establishes a connection with a second user in the social networking system 130, user accounts of the first user and the second user from the user account store 136 may act as nodes in the social graph. The connection between the first user and the second user stored by the connection store 138 is an edge between the nodes associated with the first user and the second user. Continuing this example, the second user may then send the first user a message within the social networking system 130. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 130 (or, alternatively, in an image maintained by another system outside of the social networking system 130). The image may itself be represented as a node in the social networking system 130. This tagging action may create edges between the first user and the second user as well as create an edge between each of the users and the image, which is also a node in the social graph. In yet another example, if a user confirms attending an event, the user and the event are nodes obtained from the user account store 136, where the attendance of the event is an edge between the nodes that may be retrieved from the activity log 142. By generating and maintaining the social graph, the social networking system 130 includes data describing many different types of objects and the interactions and connections among those objects, providing a rich source of socially relevant information.

The web server 132 links the social networking system 130 to one or more user devices 110 and/or one or more external systems 120 via the network 150. The web server 132 serves web pages, as well as other web-related content, such as Java, JavaScript, Flash, XML, and so forth. The web server 132 may include a mail server or other messaging functionality for receiving and routing messages between the social networking system 130 and one or more user devices 110. The messages can be instant messages, queued messages (e.g., email), text and SMS messages, or any other suitable messaging format.

The API request server 134 allows one or more external systems 120 and user devices 110 to call access information from the social networking system 130 by calling one or more API functions. The API request server 134 may also allow external systems 120 to send information to the social networking system 130 by calling APIs. The external system 120, in one embodiment, sends an API request to the social networking system 130 via the network 150, and the API request server 134 receives the API request. The API request server 134 processes the request by calling an API associated with the API request to generate an appropriate response, which the API request server 134 communicates to the external system 120 via the network 150. For example, responsive to an API request, the API request server 134 collects data associated with a user, such as the user's connections that have logged into the external system 120, and communicates the collected data to the external system 120. In another embodiment, the user device 110 communicates with the social networking system 130 via APIs in the same manner as external systems 120.

The action logger 140 is capable of receiving communications from the web server 132 about user actions on and/or off the social networking system 130. The action logger 140 populates the activity log 142 with information about user actions, enabling the social networking system 130 to discover various actions taken by its users within the social networking system 130 and outside of the social networking system 130. Any action that a particular user takes with respect to another node on the social networking system 130 may be associated with each user's account, through information maintained in the activity log 142 or in a similar database or other data repository. Examples of actions taken by a user within the social networking system 130 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 130, the action is recorded in the activity log 142. In one embodiment, the social networking system 130 maintains the activity log 142 as a database of entries. When an action is taken within the social networking system 130, an entry for the action is added to the activity log 142. The activity log 142 may be referred to as an action log.

Additionally, user actions may be associated with concepts and actions that occur within an entity outside of the social networking system 130, such as an external system 120 that is separate from the social networking system 130. For example, the action logger 140 may receive data describing a user's interaction with an external system 120 from the web server 132. In this example, the external system 120 reports a user's interaction according to structured actions and objects in the social graph.

Other examples of actions where a user interacts with an external system 120 include a user expressing an interest in an external system 120 or another entity, a user posting a comment to the social networking system 130 that discusses an external system 120 or a web page 122a within the external system 120, a user posting to the social networking system 130 a Uniform Resource Locator (URL) or other identifier associated with an external system 120, a user attending an event associated with an external system 120, or any other action by a user that is related to an external system 120. Thus, the activity log 142 may include actions describing interactions between a user of the social networking system 130 and an external system 120 that is separate from the social networking system 130.

The authorization server 144 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 120, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 120. One embodiment allows the specification of the set of entities to comprise an enumeration of entities. For example, the user may provide a list of external systems 120 that are allowed to access certain information. Another embodiment allows the specification to comprise a set of entities along with exceptions that are not allowed to access the information. For example, a user may allow all external systems 120 to access the user's work information, but specify a list of external systems 120 that are not allowed to access the work information. Certain embodiments call the list of exceptions that are not allowed to access certain information a "block list". External systems 120 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 144 contains logic to determine if certain information associated with a user can be accessed by a user's friends, external systems 120, and/or other applications and entities. The external system 120 may need authorization from the authorization server 144 to access the user's more private and sensitive information, such as the user's work phone number. Based on the user's privacy settings, the authorization server 144 determines if another user, the external system 120, an application, or another entity is allowed to access information associated with the user, including information about actions taken by the user.

Real-Time Sharing of Media Sessions

Users of the social networking system 130 may learn of each other's activities in a number of ways. As described above, each user activity within the social networking system 130 may prompt the social networking system 130 to generate a visual representation of the activity in the form of a story. A story may appear on a user's profile and in other users' news feeds. In addition, users may learn of each other's activities by interacting within a chat interface. Chat functionality allows users of the social networking system 130 to communicate with each other in real-time. A social networking chat interface may include a story indicating a chatting user's status or the activity he is engaged in at the moment. The story may include links to the user's profile, a link to the content being posted, and a link to the functionality or service that the user has accessed. Any type of data pertaining to an activity may be included in a story.

Figure 2:
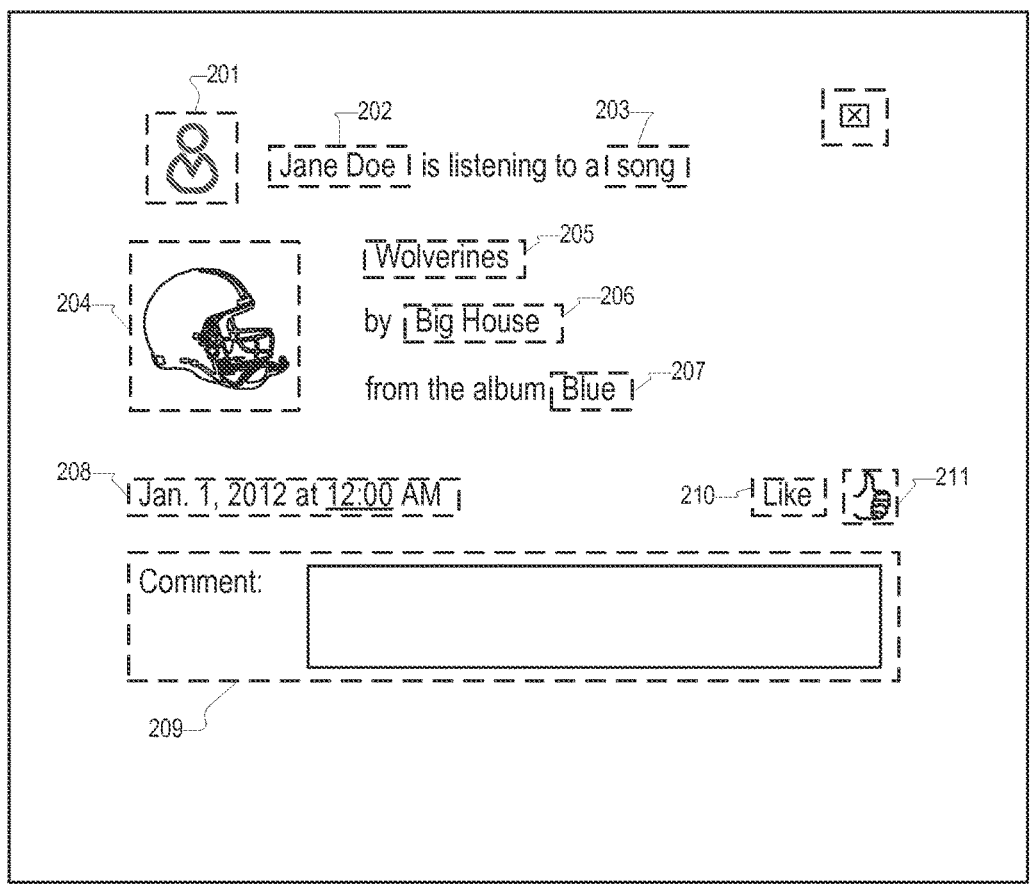
FIG. 2 illustrates an example implementation of a story in accordance with an embodiment of the invention.

FIG. 2 illustrates an example implementation of a story 200 in accordance with an embodiment of the invention. In the illustrated example, the story is presented as a discrete content item comprising a number of components. The story 200 indicates that user Jane Doe is listening to a song entitled "Wolverines". The story 200 includes components 201-212 that may link to Jane Doe's profile, functionality pertaining to the listening activity, and options to "'like'" or comment on the activity. The component 201, which corresponds to Jane's profile picture, and the component 202, which corresponds to Jane's name, may link to Jane's profile. The component 203, which corresponds to the song title; the component 204, which corresponds to a thumbnail image representing the song, album, or artist; the component 205, which corresponds to the title of the song; the component 206, which corresponds to the artist who performed the song; and the component 207, which corresponds to the album in which the song is included, may link to functionality pertaining to the listening activity. The functionality may include an option for a user to listen along with Jane Doe, as described further below. The component 208, which corresponds to the timestamp of the story, and the component 209, which corresponds to a comment box, may link to commenting functionality. The component 210, which corresponds to the word "like", and the component 211, which corresponds to a thumbs up icon, may link to "'like" functionality. The component 212, which corresponds to the X, may link to functionality for hiding the story. Other components not shown in FIG. 2 may also be included in a story.

Among the activities that users may now engage in are sharing of and participation in digital media streams and other interactive and non-interactive media sessions. Users may access media services, such as audio services, video services, gaming services, or other services for providing interactive or non-interactive media, via the social networking system 130. The services may be provided directly by the media module 146 of the social networking system 130 or by a third party via the social networking system 130. A user's accessing a media service may generate a story such as the story 200 depicted in FIG. 2.

Among these media-related activities that may generate stories are various audio-related activities. Users may upload music tracks, assemble playlists, access streaming music from external sources, or listen to radio channels through the social networking system 130. A user accessing such music-related functionality may generate a story that becomes visible to other users, most notably the user's friends. According to one embodiment of the invention, by selecting a link within the story, a user's friends may also access the music-related feature or content that the user has accessed. The user's friends may listen to the same audio track that the user is listening to. According to another embodiment, a song to which one user may join another user (or other users) in listening may be synchronized and played identically for the users so that each user hears the same thing at the same time. Synchronization in this manner allows the users to meaningfully chat or communicate about portions of the song as they are played. In an embodiment, a song may be played for users in a manner that is not synchronized.

Figure 3A:
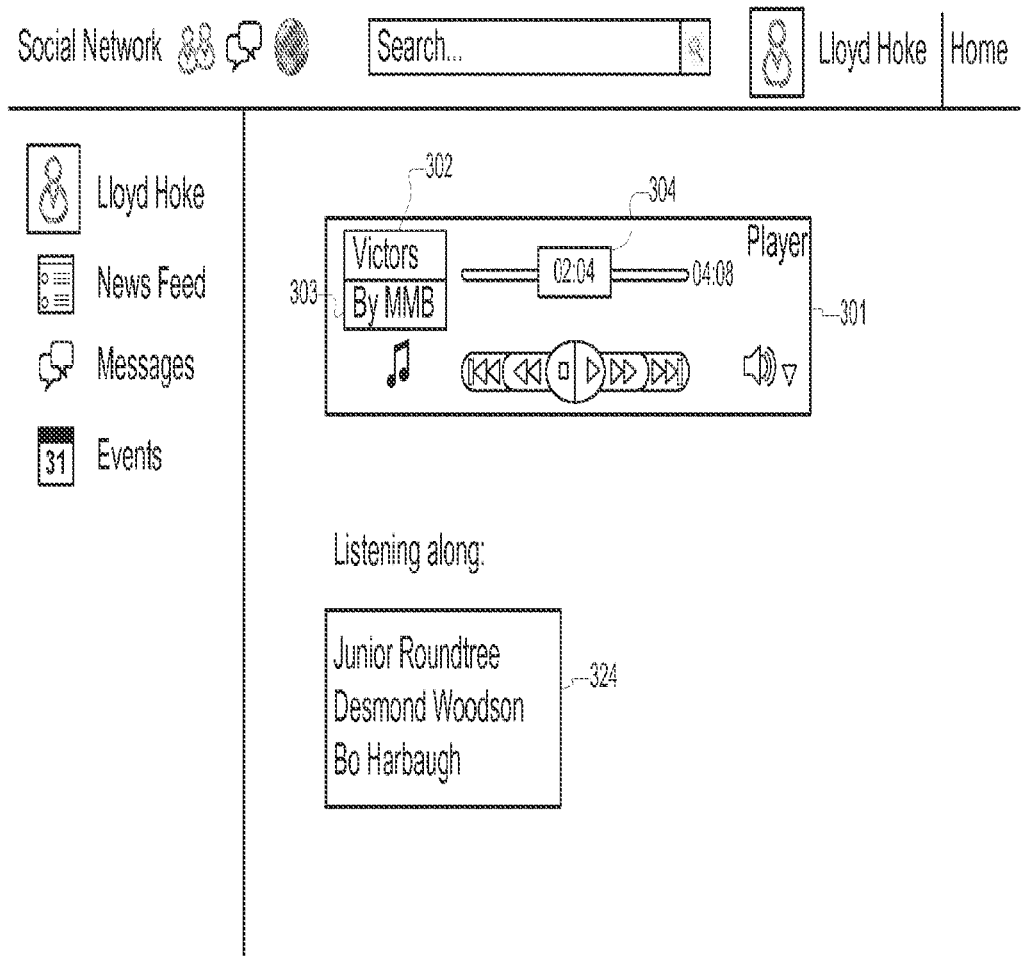
FIG. 3A illustrates an instance of an audio playback application within an interface provided by the social networking system in accordance with an embodiment of the invention.

FIG. 3A illustrates an instance of an audio playback application 301 accessed by a user Lloyd Hoke within an interface 300 provided by the social networking system 130 in accordance with an embodiment of the invention. The audio playback application 301 may be provided directly by the social networking system 130 or by a third party via the social networking system 130. The third party may have used an application programming interface (API) provided by the social networking system 130 to integrate the audio playback application 301 with the social networking system 130. The audio playback application 301 may be a music streaming utility, an Internet radio channel, an audio file player, or any program or utility capable of playing audio within the social networking portal. As indicated by a track title field 302 and an artist name field 303, user Lloyd Hoke is listening to a song entitled "Victors" performed by an artist named MMB, respectively. As indicated by a progress meter 304, two minutes and four seconds have elapsed in the song. Lloyd Hoke may be listening to "Victors" as part of a playlist, radio station, live stream, or other sampling of different audio tracks. Alternatively, Lloyd Hoke may be listening to the song "Victors" by itself.

Figure 3B:
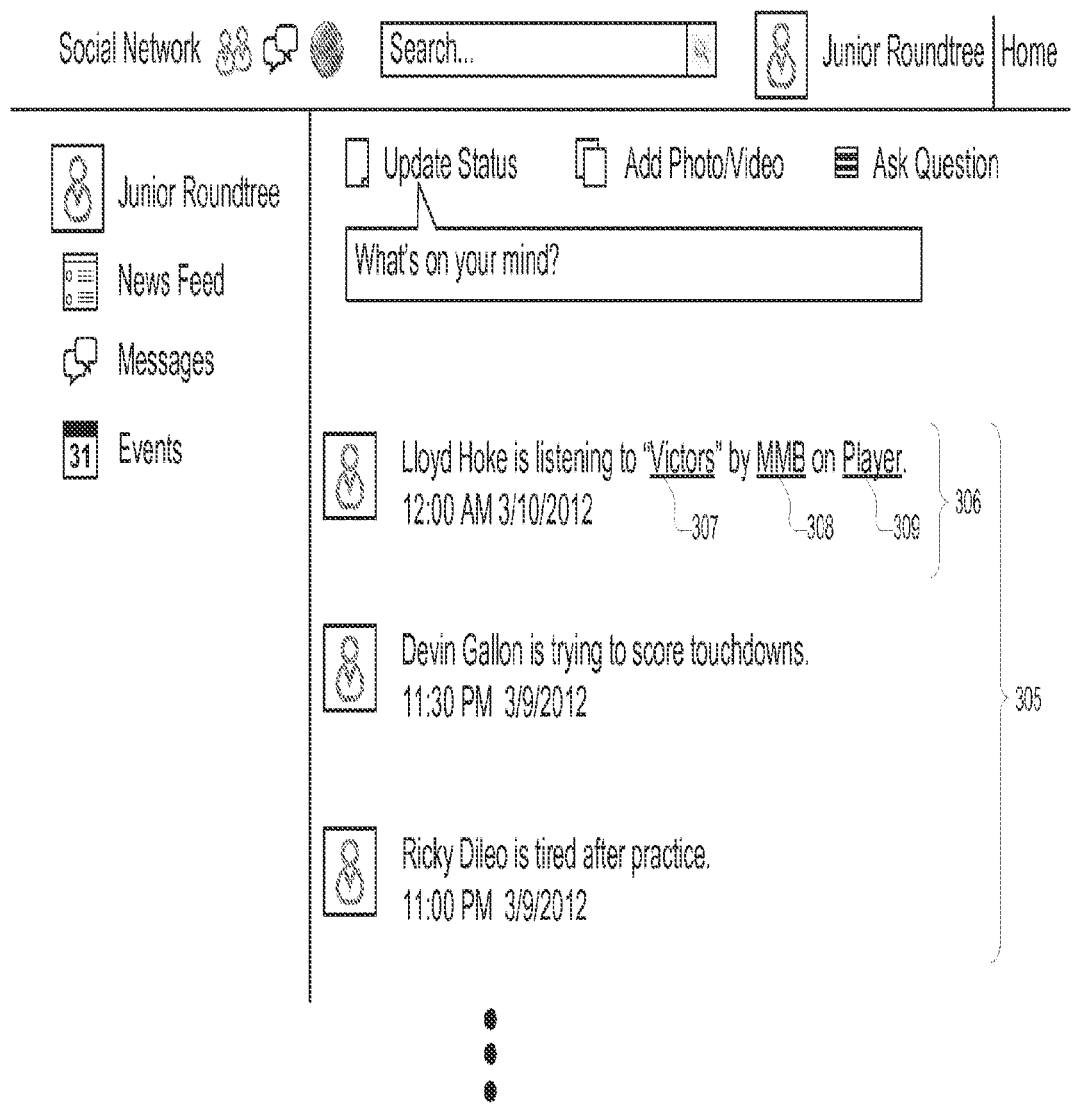
FIG. 3B illustrates a news feed provided to a user of the social networking system in accordance with an embodiment of the invention.

FIG. 3B illustrates a news feed 305 provided to a user Junior Roundtree in accordance with an embodiment of the invention. User Junior Roundtree may be friends with user Lloyd Hoke, and their activities may appear in each other's news feeds. This may be because they interact with each other frequently or share similar interests. According to one embodiment of the invention, the social networking system 130 uses an algorithm to determine which stories appear in user Junior Roundtree's news feed. Any technique for determining whether Lloyd Hoke's stories appear in Junior Roundtree's news feed may be used. In FIG. 3B, the news feed 305 of user Junior Roundtree includes a story 306 including components 307, 308, and 309 indicating that user Lloyd Hoke is listening to the song "Victors", which is performed by the artist MMB using the audio playback application, respectively. Each of the components 307, 308, and 309 may link to various features or functionality of the audio playback application.

Figure 3C:
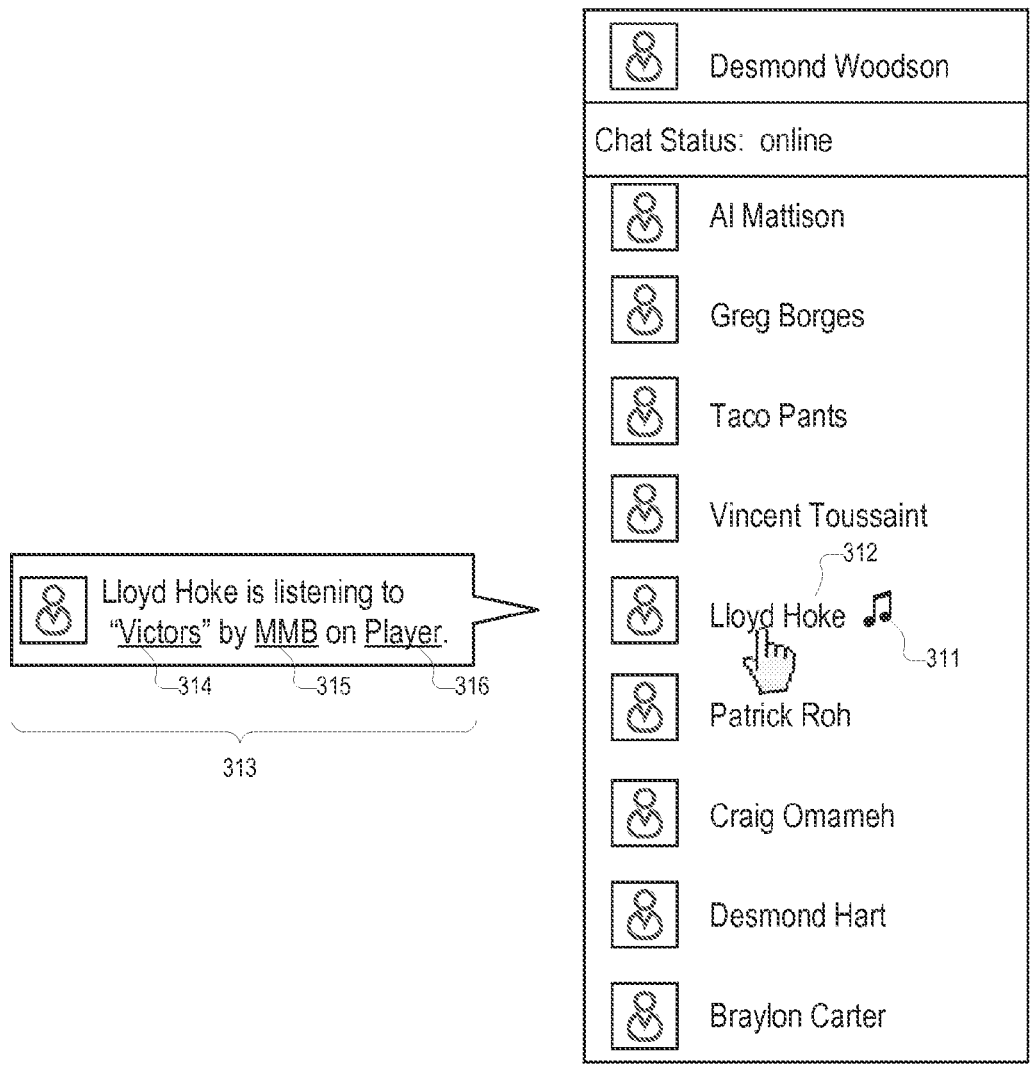
FIG. 3C illustrates a chat interface provided to a user of the social networking system in accordance with an embodiment of the invention.

FIG. 3C illustrates a chat interface 310 provided to a user Desmond Woodson in accordance with an embodiment of the invention. The chat interface 310 includes user Lloyd Hoke along with several other users of the social networking system 130. User Desmond Woodson may be friends with user Lloyd Hoke, and they may appear on each other's lists of chat "buddies". In the chat interface 310, a musical note icon 311 appears next to user Lloyd Hoke's name 312, indicating that Lloyd Hoke is engaging in some audio-related activity. Desmond Woodson's positioning a mouse pointer over the chat icon reveals a story 313, which contains components 314, 315, and 316 that may be analogous to the components 307, 308, and 309, respectively.

Figure 3D:
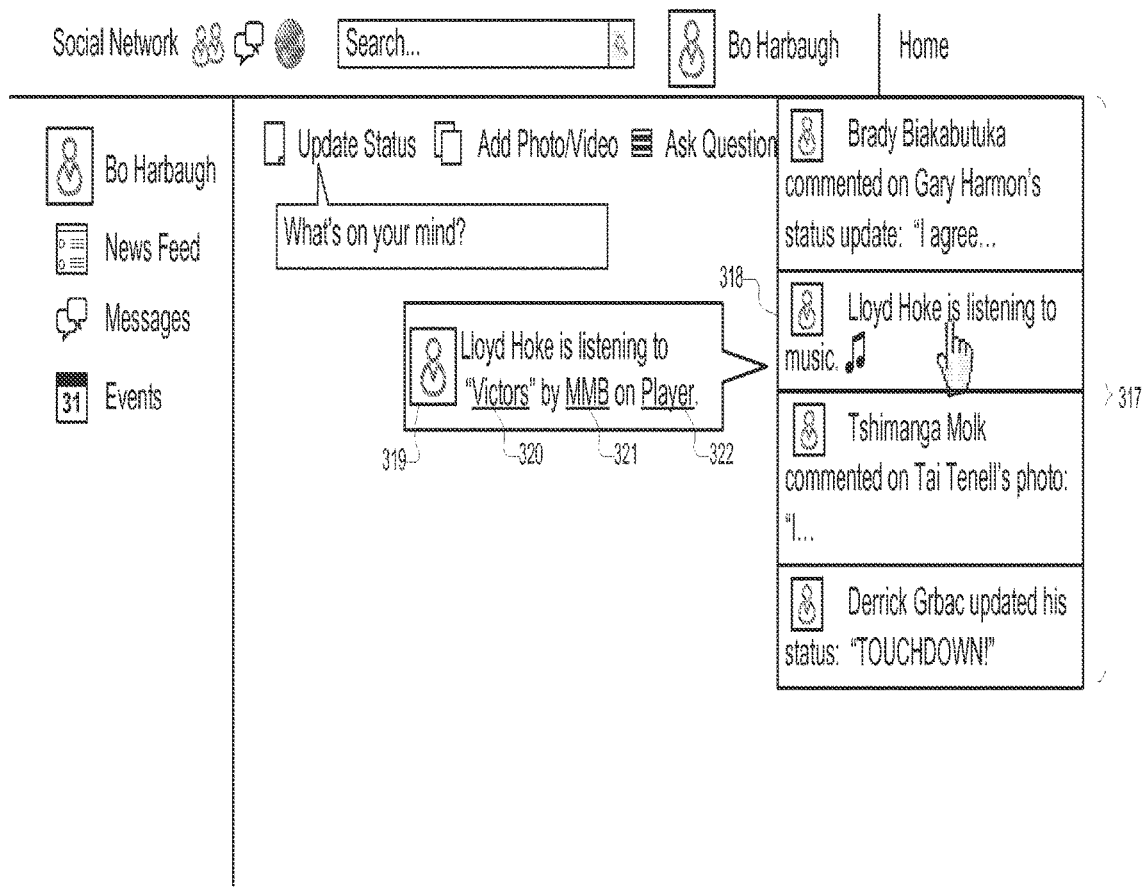
FIG. 3D illustrates a ticker interface provided to a user of the social networking system in accordance with an embodiment of the invention.

FIG. 3D illustrates a ticker interface 317 provided to a user Bo Harbaugh in accordance with an embodiment of the invention. A ticker interface is a miniature, continuously updated version of a news feed that displays information about other users' activities as they occur. According to one embodiment of the invention, the ticker interface 317 may appear adjacent to a news feed within a home screen 324 of user Bo Harbaugh. The ticker interface 317 may include snippets of information about various activities, which reveal full-sized stories when user Bo Harbaugh positions his mouse pointer over them. The snippets that appear in the ticker interface 317 may be determined by an algorithm similar to that used to determine which stories appear in a news feed. Any technique for determining which snippets appear in the ticker interface 317 may be used. In FIG. 3D, a snippet 318 indicating that user Lloyd Hoke is engaging in an activity appears in the ticker interface 317.

User Bo Harbaugh may be friends with user Lloyd Hoke or may have otherwise elected to receive updates on Lloyd Hoke's activity. Bo Harbaugh's positioning a mouse pointer over the snippet 318 reveals story 319, which contains components 320, 321, and 322 that may be analogous to the components 307, 308, and 309, respectively.

FIGS. 3B, 3C, and 3D illustrate users Junior Roundtree, Desmond Woodson, and Bo Harbaugh learning, through various interfaces presented by the social networking system 130, that user Lloyd Hoke is listening to the song "Victors" performed by the artist MMB using the audio playback application. Other interfaces may be used to indicate to a user that another user is listening to a song or receiving other content. According to one embodiment, a user may learn of another user's activity from a communication external to the social networking system 130, such as an email or a notification received on a mobile device. Junior Roundtree, Desmond Woodson, and Bo Harbaugh may be friends with user Lloyd Hoke or may come to learn of Lloyd Hoke's audio activity through another type of relationship, such as a shared interest relationship. According to one embodiment, users may identify other users who share similar interests and learn of their activities through a shared interests feature provided by the social networking system 130. In the example of FIGS. 3B, 3C, and 3D, Junior Roundtree, Desmond Woodson, and Bo Harbaugh may be interested in the information about Lloyd Hoke listening to 'The Victors' and may wish to listen along with Lloyd Hoke. The users may enjoy the particular song, genre, or artist that Lloyd Hoke is listening to. Alternatively, the users may be intrigued by Lloyd Hoke's music tastes and wish to follow along with his musical selections. Thus, according to one embodiment of the invention, by selecting one of the links corresponding to the components 307-309, 314-15, or 320-322, a user may be taken to an instance of the audio playback application that streams "Victors" by MBB to him.

Figure 4:
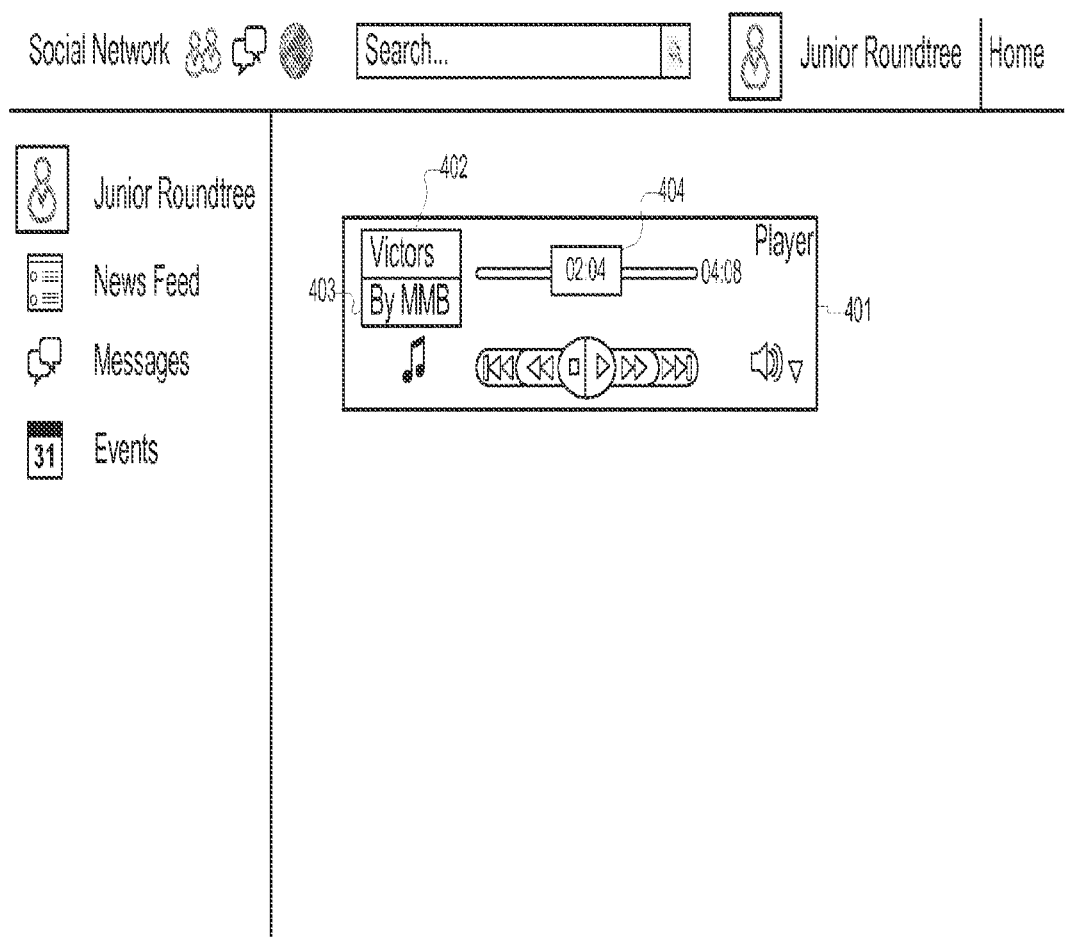
FIG. 4 illustrates an instance of the audio playback application within an interface provided by the social networking system in accordance with an embodiment of the invention.

FIG. 4 illustrates an instance of the audio playback application 401 within an interface 400 provided by the social networking system 130 in accordance with an embodiment of the invention. In the illustrated example, the audio playback application 400 has been accessed by Junior Roundtree after selecting any of the components 307-309. However, Desmond Woodson and Bo Harbaugh may similarly access an instance of the audio playback application by selecting the components 314-316 and 320-322, respectively. The audio playback application 401 includes a track title field 402, an artist name field 403, and a progress meter 404. In the illustrated example, the contents of each of the components 402, 403, and 404 are identical to those of 302, 303, and 304, indicating that Junior Roundtree is also listening to "Victors" by MMB. As indicated by the progress meters 302 and 402, Junior Roundtree is listening to "Victors" at the same point in the song, 02:04. In this embodiment, the streams are synchronized and may ultimately be controlled by Lloyd Hoke. Thus, if Lloyd Hoke pauses the song, the song may be paused for user Junior Roundtree and others listening along as well. According to one embodiment, when the song "Victors" terminates, the listening session of user Junior Roundtree, as well as that of any other user listening along with Lloyd Hoke, also terminates, irrespective of whether Lloyd Hoke's stream transitions to another song or not. This embodiment may be implemented if Lloyd Hoke has only elected to share his listening session for a single audio track. Alternatively, this embodiment may be implemented if Junior Roundtree, or any other user listening along with Lloyd Hoke, has only elected to listen along on a single audio track. According to another embodiment, when the song "Victors" terminates, the streams of all users listening with Lloyd Hoke transition to the same song that Lloyd Hoke's stream transitions to. According to yet another embodiment, each of the users listening along with Lloyd Hoke are given the option to continue on to the next song in Lloyd Hoke's stream or terminate their sessions.

Returning to FIG. 3A, the audio playback application 301 includes a window 323 indicating which other friends of Lloyd Hoke are listening along with him. As shown, Lloyd Hoke is joined by users Junior Roundtree, Desmond Woodson, and Bo Harbaugh in listening to "Victors". According to one embodiment, users Junior Roundtree, Desmond Woodson, and Bo Harbaugh are all friends of user Lloyd Hoke but need not be friends of each other.

The examples illustrated in FIGS. 2, 3A-3D, and 4 involve an audio streaming session. However, a user may participate in a media session in which any kind of interactive or non-interactive media is provided. Other forms of non-interactive media include video. The social networking system 130 may provide functionality for users to upload and share videos, which may then be shared with other users. Alternatively, the social networking system 130 may allow third-party video hosting services to stream videos via the social networking system 130. Other forms of interactive media include games. The social networking system 130 may provide functionality for users to play games. Alternatively, the social networking system 130 may allow third-party gaming services to provide their games via the social networking system 130. Users may play games alone, with each other, or against each other. According to one embodiment, a user's video watching or game playing activity may be described in a story, snippet, chat interface icon, or other reference within an interface of the social networking system 130. A media session may be initiated from a computer, a mobile device, a tablet, or any type of device used to access the social networking system 130. Similarly, a user may participate in a media session from a computer, a mobile device, a tablet, or any type of device used to access the social networking system 130. The user who initiates a media session and the user who participates in the media session may use different types of devices to access the social networking system 130.

Figure 5A:
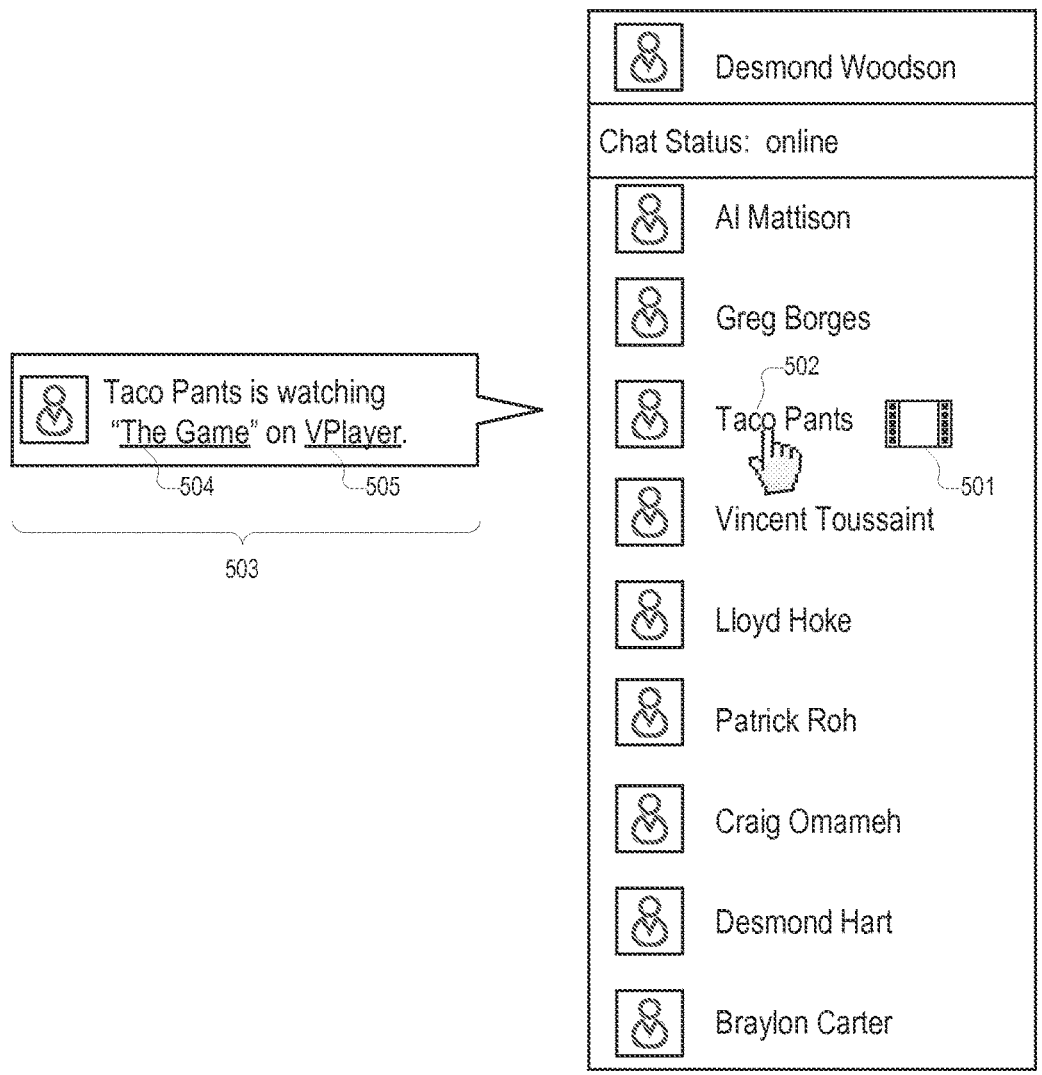
FIG. 5A illustrates a chat interface provided to a user of the social networking system that lists a user watching a movie in accordance with an embodiment of the invention.

FIG. 5A illustrates a chat interface 500 provided to a user Desmond Woodson in accordance with an embodiment of the invention. The chat interface 500 includes user Taco Pants along with several other users of the social networking system 130. User Desmond Woodson may be friends with user Taco Pants, and they may appear on each other's lists of chat "buddies". In the chat interface 500, a film icon 501 appears next to user Taco Pants' name 502, indicating that Taco Pants is engaging in some video-related activity. Desmond Woodson's positioning a mouse pointer over the chat icon reveals story 503, which contains components 504 and 505 indicating that Taco Pants is watching a video entitled "The Game" using a video playback application called VPlayer, respectively. Desmond Woodson may select either of the components 504 and 505 and initiate an instance of the video playback application that streams "The Game" to him. According to one embodiment, Desmond Woodson's video streaming session may be synchronized with Taco Pants' video streaming session.

Figure 5B:
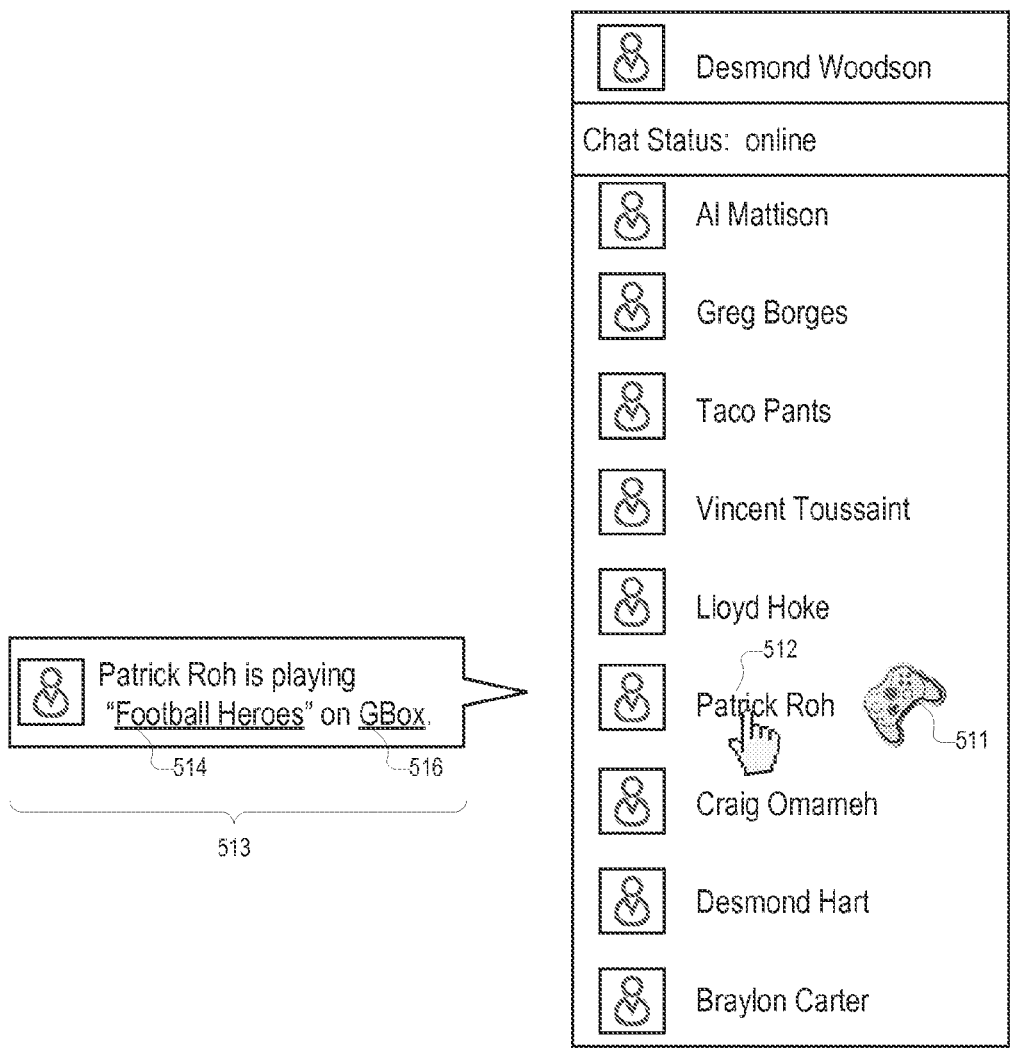
FIG. 5B illustrates a chat interface provided to a user of the social networking system that lists a user playing a game in accordance with an embodiment of the invention.

FIG. 5B depicts a chat interface 510 provided to a user Desmond Woodson in accordance with an embodiment of the invention. The chat interface 510 includes user Patrick Roh along with several other users of the social network. User Desmond Woodson may be friends with user Patrick Roh, and they may appear on each other's lists of chat "buddies". In the chat interface 510, a video game controller icon 511 appears next to user Patrick Roh's name 512, indicating that Patrick Roh is engaging in some video game-related activity. Desmond Woodson's positioning a mouse pointer over the chat icon reveals story 513, which contains components 514 and 515 indicating that Patrick Roh is playing a game entitled "Football Heroes" using a gaming application called GBox, respectively. Desmond Woodson may select either of the components 504 and 505 and initiate an instance of the video playback application in which he plays "Football Heroes". Desmond Woodson's gaming session may be synchronized with Patrick Roh's gaming session. According to one embodiment, synchronization in gaming sessions may be implemented such that the user participating in the session competes within the game against the user who initiated the session. According to another embodiment, synchronization in gaming sessions may be implemented such that the user participating in the session collaborates within the game with a user who initiated the session.

According to one embodiment of the invention, when a user begins participating in a media session, a chat session may be automatically initiated between the participating user and the user who initiated the media session. If both users are signed into the chat interface and are visible to each other, the social networking system 130 may initiate a chat session including the participating user and the user who initiated the media session. Alternatively, either user may be prompted to indicate whether they would like to chat with the other user, and the chat session may be initiated if both users respond in the affirmative. According to an embodiment, the chat session may include the initiating user and one participating user. Alternatively, the chat session may include multiple participating users. The initiating user may have the ability to dictate whether participating users can chat with him or not, and may restrict particular participating users from chatting with him or all participating users from chatting with him. This functionality may be provided as part of a privacy settings feature, as described further below.

According to one embodiment of the invention, there are several conditions that may trigger the appearance of stories or other indications about a user's media session to other users. These conditions may exist apart from and in addition to any general criteria or algorithms used to determine which stories or other indications appear in a user's news feed, chat interface, ticker interface, or other interface. One such condition is whether the user who may potentially join in the media session is a member of or otherwise has access to the media module 146. If no such access exists, the social networking system 130 may not provide an indication to the user that there is a media session to potentially join. Another condition may pertain to the availability of the service that is providing the media. Some media services may only operate in certain countries and may restrict use of their applications to users in those countries. This may be due to content licensing restrictions or other reasons.

Another condition pertains to the privacy of the initiating user. For example, returning to FIGS. 3A-3D, user Lloyd Hoke may elect to keep his listening session private such that his activity of listening to "Victors" is not revealed to his friends. Privacy settings of other users who might otherwise join the media session may also determine whether the media session is revealed to them. For example, assume user Junior Roundtree and user Desmond Woodson are not friends, and user Desmond Woodson has set his privacy settings so that only friends may see his activities with the social networking system 130. In this instance, if user Junior Roundtree has already joined the listening session of the initiating user Lloyd Hoke, then an indication of the listening session may not be presented to user Desmond Woodson because publication of his joining the listening session would violate his privacy settings. A user may specify privacy restrictions for a particular song, artist, genre, title, game, or generally for all media activity within a particular application.

Figure 6:
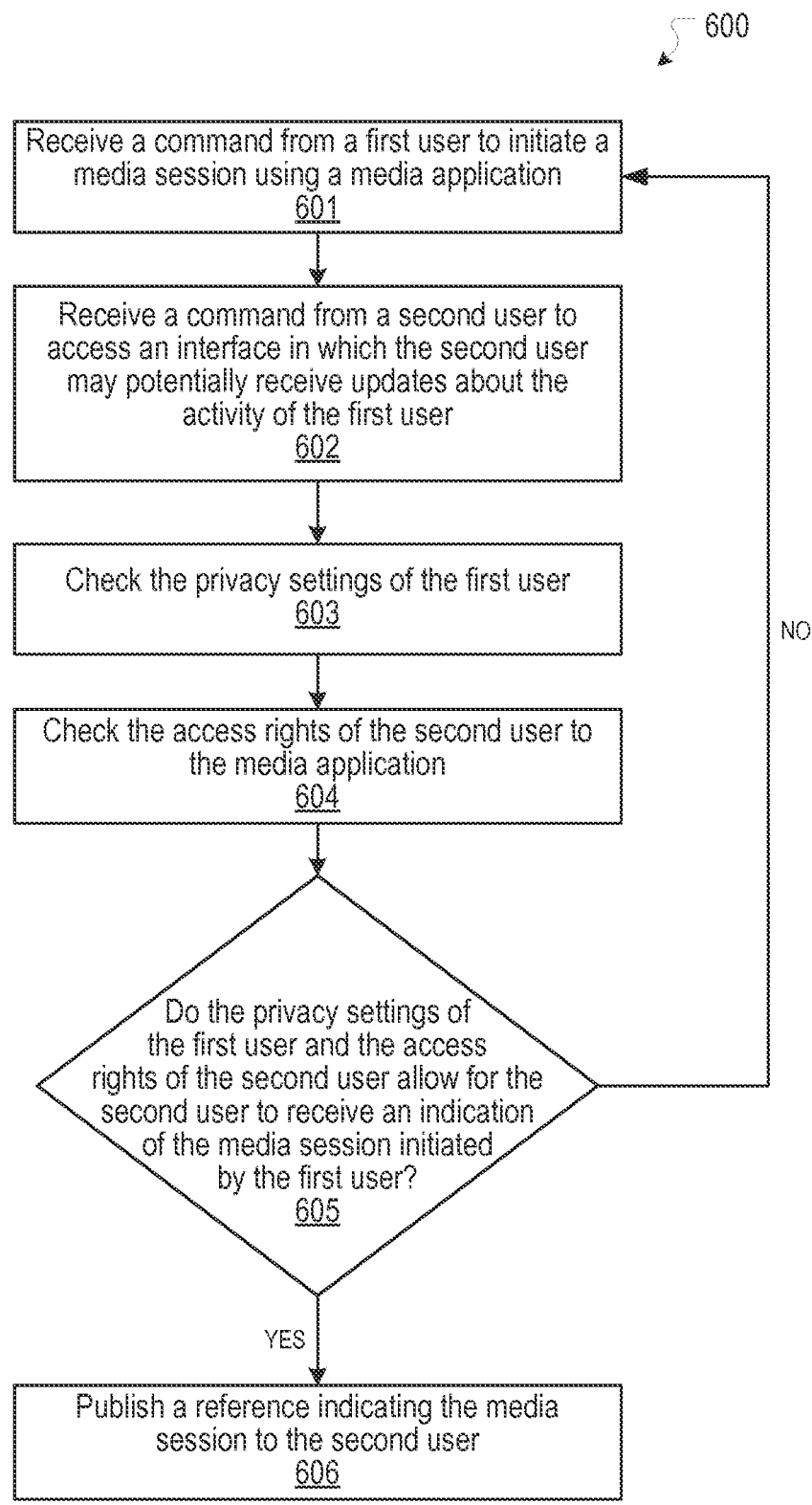
FIG. 6 illustrates a process for determining whether an indication about a digital media session of an initiating user is presented to another user who may potentially join the listening session in accordance with an embodiment of the invention.

FIG. 6 illustrates a process 600 for determining whether an indication about a digital media session of an initiating user is presented to another user who may potentially join the listening session in accordance with an embodiment of the invention. At block 601, the social networking system 130 receives a command from a first user to initiate a media session using a media application. The media application may be provided directly by the social networking system 130 or by a third party via the social networking system 130. The media application may be an audio application, a video application, a gaming application, or any other application for providing media to users of the social networking system 130. At block 602, the social networking system 130 receives a command from a second user to access an interface in which the second user may potentially receive updates about the activity of the first user. The second user may be a friend of the first user. The interface may be a news feed, a ticker interface, a chat interface, or other interface. At block 603, the social networking system 130 checks the privacy settings of the first user. The privacy settings may pertain to the particular media application, to the particular type of media, to the media title the user is receiving, or to the user's activity on the social networking system 130 in general. At block 604, the social networking system 130 checks the access rights of the second user to the media application. At block 605, the social networking system 130 determines whether the privacy settings of the first user and the access rights of the second user allow for the second user to receive an indication of the media session initiated by the first user. If the privacy settings of the first user and the access rights of the second user allow for the second user to receive an indication of the media session initiated by the first user, then at block 606, the social networking system 130 publishes a reference indicating the media session to the second user. If the privacy settings of the first user and the access rights of the second user do not allow for the second user to receive an indication of the media session initiated by the first user, then the process 600 returns to block 601. In an embodiment, the sequence of the process 600 may be modified.

Figure 7:
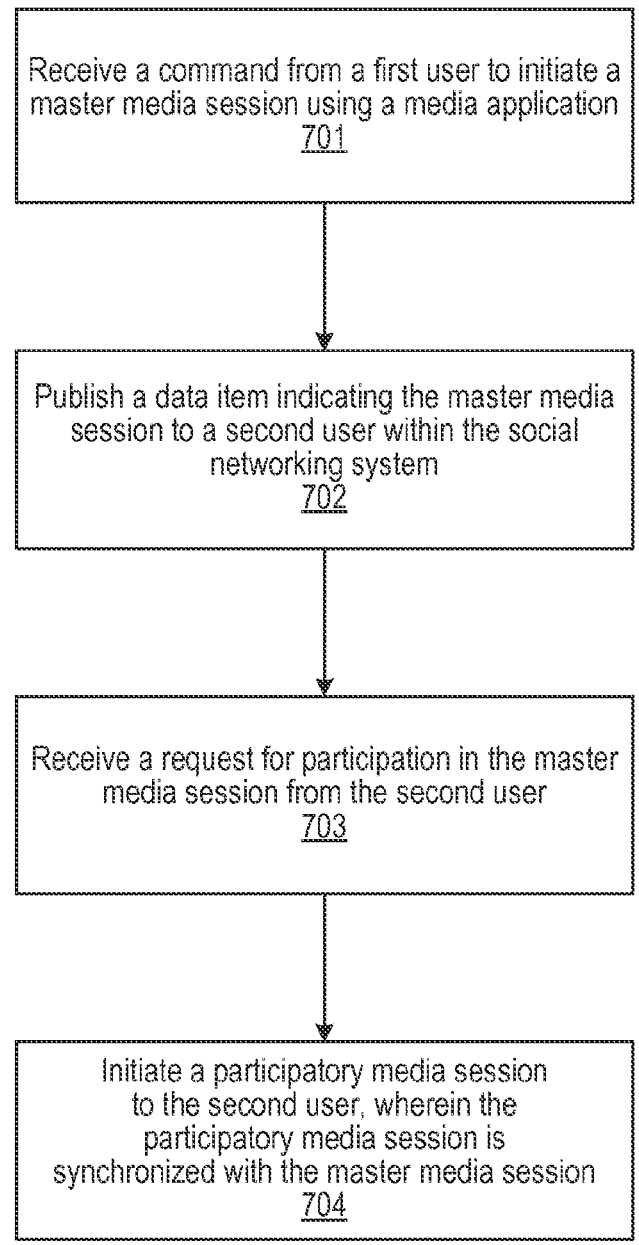
FIG. 7 illustrates a process for real-time sharing of media sessions in accordance with an embodiment of the invention.

FIG. 7 depicts a process 700 for sharing of media sessions in accordance with an embodiment of the invention. At block 701, the social networking system 130 receives a command from a first user to initiate a master media session using a media application. The media application may be provided directly by the social networking system 130 or by a third party via the social networking system 130. The media application may be an audio application, a video application, a gaming application, or any other application for providing media to users of the social networking system 130. At block 702, the social networking system 130 publishes a reference indicating the master media session to a second user within the social networking system 130. The reference may be a story, a snippet, or other indication about the media session. The data item may be published within a news feed of the second user, a ticker of the second user, or a chat interface of the second user. The data item may comprise components reciting, for example, the name of the application providing the master media session as well as the name, artist, or genre of the selection that the first user is currently receiving within the master media session. At block 703, the social networking system 130 receives a request for participation in the master media session from the second user. The request may be received in response to the second user's selection of one of the components of the reference. At block 704, the social networking system 130 initiates a participatory media session to the second user. According to one embodiment of the invention, the participatory media session is synchronized with the master media session. In an embodiment, the processes 600 and 700 may be performed at least partially by the media module 146.

Hardware Implementation

Figure 8:
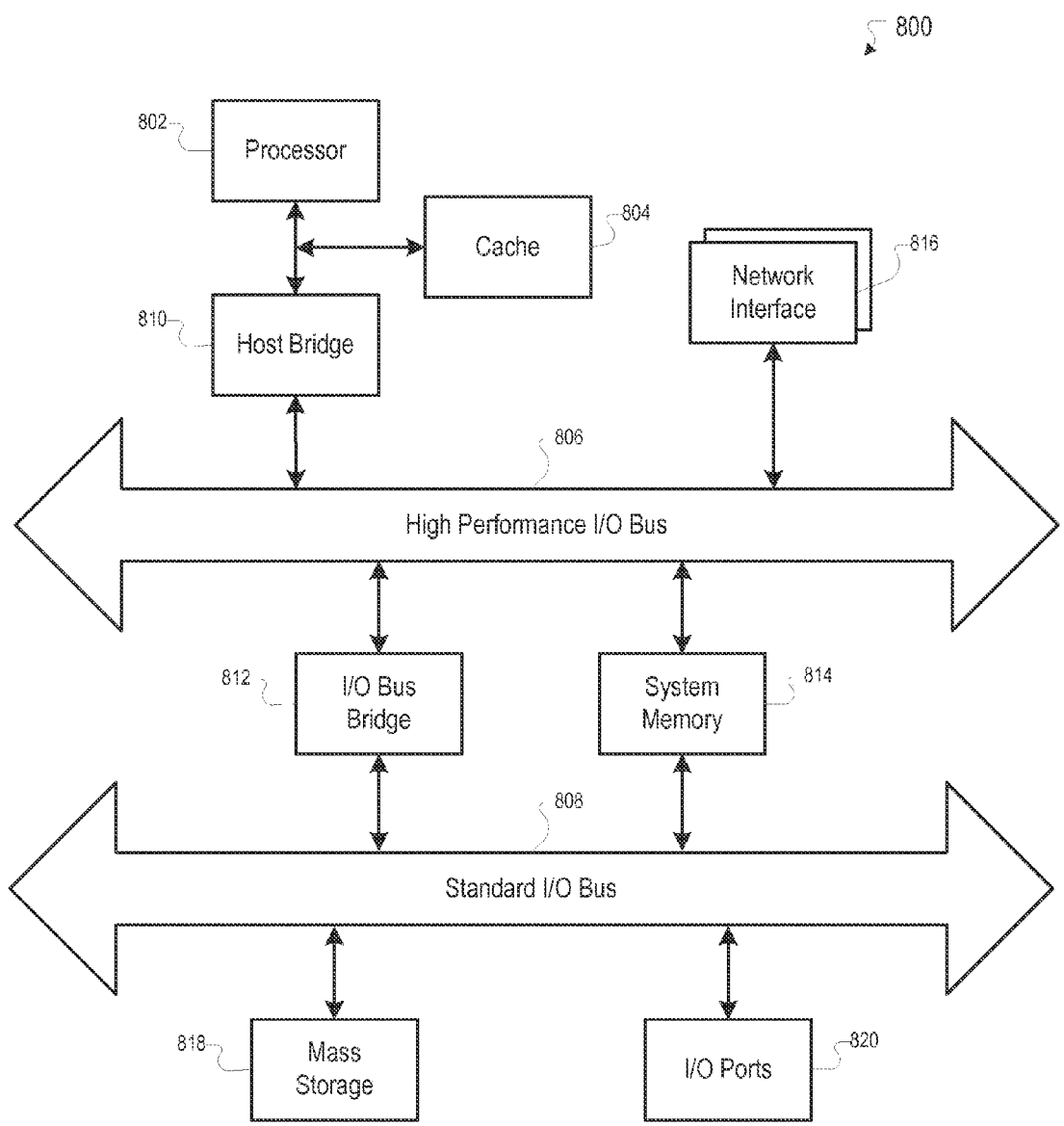
FIG. 8 illustrates an example of a computer system that may be used to implement one or more of the embodiments described herein in accordance with an embodiment of the invention.

The foregoing processes and features can be implemented by a wide variety of machine and computer system architectures and in a wide variety of network and computing environments. FIG. 8 illustrates an example of a computer system 800 that may be used to implement one or more of the embodiments described herein. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 130, the user device 110, and the external system 120, or a component thereof In an embodiment of the invention, the computer system 800 may be one server among many that constitutes all or part of the social networking system 130.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Furthermore, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   by one or more computing devices of a social-networking system, identifying a set of one or more second users to participate in an ongoing media session, wherein:
      a first user initiated the ongoing media session, wherein the ongoing media session comprises one or more media items; and
      the identification of each of the one or more second users is based on:
         determining that at least one of the one or more media items is available to the second user;
         a social-networking relationship of the second user with respect to the first user; or
         a social-networking relationship of the second user with respect to the one or more media items;
   by the one or more computing devices, provisioning the ongoing media session to the identified second users, wherein the identified second users join the ongoing media session at a current point in time; and
   by the one or more computing devices, sending a notification to the first user indicating that the identified second users have joined the ongoing media session.

2. The method of claim 1, wherein the ongoing media session comprises playing a media stream on a media playback application of a client computing device of the first user, wherein the media stream includes at least one of an audio stream, a video stream, and a gaming session.

3. The method of claim 1, wherein identifying a particular second user comprises determining that the first user and the particular second user are friends within a social-networking system.

4. The method of claim 1, wherein sending the notification comprises providing a user interface for the first user to send a message to the identified second users.

5. The method of claim 1, further comprising presenting the ongoing media session to the identified second users as a second media session initiated at the current point in time of the ongoing media session.

6. The method of claim 1, further comprising:
   providing for a third user of the social-networking system a reference about the ongoing media session;
   receiving a request to participate in the ongoing media session from the third user; and
   provisioning the ongoing media session to the third user at a current point in time of the ongoing media session.

7. The method of claim 1, wherein a media item of the ongoing media session is selected by the first user.

8. The method of claim 1, further comprising sending to each of the identified second users a reference about the ongoing media session.

9. The method of claim 8, wherein the reference is associated with a resource of a social-networking system, the resource including at least one of a news feed, a ticker, and a chat interface.

10. The method of claim 1, wherein the identifying is further based on privacy settings of the first user.

11. The method of claim 10, wherein the privacy settings apply to a particular media item, a particular artist, a particular genre, or for all media items of the ongoing media session.

12. The method of claim 10, wherein the privacy settings are provided by the first user and stored on an authorization server, and identifying the second users further comprises determining by the authorization server whether a particular second user has access to view ongoing media sessions of the first user.

13. The method of claim 1, wherein the identifying is based on an indication that a particular second user is interested in a particular genre or artist associated with a media item of the ongoing media session.

14. The method of claim 1, wherein the determining if a media item of the ongoing media session is available to the second user is based on collaboration with a media service.

15. The method of claim 1, further comprising causing termination of the provisioning of the ongoing media session to the identified second users when a media item in the ongoing media session ends.

16. The method of claim 1, further comprising in response to an indication that the first user has paused the ongoing media session, pausing the ongoing media session provisioned to the identified second users.

17. The method of claim 1, further comprising initiating a chat session between the first user and the identified second users.

18. The method of claim 17, wherein the first user may select which of the identified second users are provided with the chat session.

19. A non-transitory computer-readable storage medium storing computer executable instructions that is operable when executed to:
   identify a set of one or more second users to participate in an ongoing media session, wherein:
      a first user initiated the ongoing media session, wherein the ongoing media session comprises one or more media items; and
      the identification of each of the one or more second users is based on:

determining that at least one of the one or more media items is available to the second user;
a social-networking relationship of the second user with respect to the first user; or
a social-networking relationship of the second user with respect to the one or more media items;
provision the ongoing media session to the identified second users, wherein the identified second users join the ongoing media session at a current point in time; and
send a notification to the first user indicating that the identified second users have joined the ongoing media session.

20. A system comprising:
at least one processor; and
a memory storing instructions configured to instruct the at least one processor to:
identify a set of one or more second users to participate in an ongoing media session, wherein:
  a first user initiated the ongoing media session, wherein the ongoing media session comprises one or more media items; and
  the identification of each of the one or more second users is based on:
    determining that at least one of the one or more media items is available to the second user;
    a social-networking relationship of the second user with respect to the first user; or
    a social-networking relationship of the second user with respect to the one or more media items;
provision the ongoing media session to the identified second users, wherein the identified second users join the ongoing media session at a current point in time; and
send a notification to the first user indicating that the identified second users have joined the ongoing media session.

21. The medium of claim 19, wherein the ongoing media session comprises playing a media stream on a media playback application of a client computing device of the first user, wherein the media stream includes at least one of an audio stream, a video stream, and a gaming session.

22. The medium of claim 19, wherein identifying a particular second user comprises determining that the first user and the particular second user are friends within a social-networking system.

23. The medium of claim 19, wherein sending the notification comprises providing a user interface for the first user to send a message to the identified second users.

24. The medium of claim 19, further comprising presenting the ongoing media session to the identified second users as a second media session initiated at the current point in time of the ongoing media session.

25. The medium of claim 19, further comprising:
providing for a third user of the social-networking system a reference about the ongoing media session;
receiving a request to participate in the ongoing media session from the third user; and
provisioning the ongoing media session to the third user at a current point in time of the ongoing media session.

26. The medium of claim 19, wherein a media item of the ongoing media session is selected by the first user.

27. The medium of claim 19, further comprising sending to each of the identified second users a reference about the ongoing media session.

28. The medium of claim 27, wherein the reference is associated with a resource of a social-networking system, the resource including at least one of a news feed, a ticker, and a chat interface.

29. The medium of claim 19, wherein the identifying is further based on privacy settings of the first user.

30. The medium of claim 29, wherein the privacy settings apply to a particular media item, a particular artist, a particular genre, or for all media items of the ongoing media session.

31. The medium of claim 29, wherein the privacy settings are provided by the first user and stored on an authorization server, and identifying the second users further comprises determining by the authorization server whether a particular second user has access to view ongoing media sessions of the first user.

32. The medium of claim 19, wherein the identifying is based on an indication that a particular second user is interested in a particular genre or artist associated with a media item of the ongoing media session.

33. The medium of claim 19, wherein the determining if a media item of the ongoing media session is available to the second user is based on collaboration with a media service.

34. The medium of claim 19, further comprising causing termination of the provisioning of the ongoing media session to the identified second users when a media item in the ongoing media session ends.

35. The medium of claim 19, further comprising in response to an indication that the first user has paused the ongoing media session, pausing the ongoing media session provisioned to the identified second users.

36. The medium of claim 19, further comprising initiating a chat session between the first user and the identified second users.

37. The medium of claim 36, wherein the first user may select which of the identified second users are provided with the chat session.

38. The system of claim 20, wherein the ongoing media session comprises playing a media stream on a media playback application of a client computing device of the first user, wherein the media stream includes at least one of an audio stream, a video stream, and a gaming session.

39. The system of claim 20, wherein identifying a particular second user comprises determining that the first user and the particular second user are friends within a social-networking system.

40. The system of claim 20, wherein sending the notification comprises providing a user interface for the first user to send a message to the identified second users.

41. The system of claim 20, further comprising presenting the ongoing media session to the identified second users as a second media session initiated at the current point in time of the ongoing media session.

42. The system of claim 20, further comprising:
providing for a third user of the social-networking system a reference about the ongoing media session;
receiving a request to participate in the ongoing media session from the third user; and
provisioning the ongoing media session to the third user at a current point in time of the ongoing media session.

43. The system of claim 20, wherein a media item of the ongoing media session is selected by the first user.

44. The system of claim 20, further comprising sending to each of the identified second users a reference about the ongoing media session.

45. The system of claim 44, wherein the reference is associated with a resource of a social-networking system, the resource including at least one of a news feed, a ticker, and a chat interface.

46. The system of claim 20, wherein the identifying is further based on privacy settings of the first user.

47. The system of claim 46, wherein the privacy settings apply to a particular media item, a particular artist, a particular genre, or for all media items of the ongoing media session.

48. The system of claim 46, wherein the privacy settings are provided by the first user and stored on an authorization server, and identifying the second users further comprises determining by the authorization server whether a particular second user has access to view ongoing media sessions of the first user.

49. The system of claim 20, wherein the identifying is based on an indication that a particular second user is interested in a particular genre or artist associated with a media item of the ongoing media session.

50. The system of claim 20, wherein the determining if a media item of the ongoing media session is available to the second user is based on collaboration with a media service.

51. The system of claim 20, further comprising causing termination of the provisioning of the ongoing media session to the identified second users when a media item in the ongoing media session ends.

52. The system of claim 20, further comprising in response to an indication that the first user has paused the ongoing media session, pausing the ongoing media session provisioned to the identified second users.

53. The system of claim 20, further comprising initiating a chat session between the first user and the identified second users.

54. The system of claim 53, wherein the first user may select which of the identified second users are provided with the chat session.

* * * * *